(12) United States Patent
Sun et al.

(10) Patent No.: US 12,554,661 B2
(45) Date of Patent: Feb. 17, 2026

(54) DYNAMIC SELF-ADAPTIVE VIRTUAL CHANNEL MAPPING METHOD AND APPARATUS, AND STORAGE MEDIUM

(71) Applicant: SUZHOU METABRAIN INTELLIGENT TECHNOLOGY CO., LTD., Jiangsu (CN)

(72) Inventors: Xu Sun, Jiangsu (CN); Yulong Zhou, Jiangsu (CN); Gang Liu, Jiangsu (CN); Tuo Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 143 days.

(21) Appl. No.: 18/696,346

(22) PCT Filed: Apr. 26, 2022

(86) PCT No.: PCT/CN2022/089353
§ 371 (c)(1),
(2) Date: Mar. 27, 2024

(87) PCT Pub. No.: WO2023/087621
PCT Pub. Date: May 25, 2023

(65) Prior Publication Data
US 2024/0403245 A1    Dec. 5, 2024

(30) Foreign Application Priority Data
Nov. 16, 2021 (CN) .......................... 202111354729.5

(51) Int. Cl.
G06F 13/18 (2006.01)
G06F 15/17 (2006.01)

(52) U.S. Cl.
CPC ............. *G06F 13/18* (2013.01); *G06F 15/17* (2013.01); *G06F 2213/0026* (2013.01)

(58) Field of Classification Search
None
See application file for complete search history.

(56) References Cited

U.S. PATENT DOCUMENTS 10,176,126 B1 *   1/2019   Banerjee ............ G06F 13/4221
2006/0259656 A1 * 11/2006  Sullivan ............... H04L 41/145
                                                                710/316
(Continued)

FOREIGN PATENT DOCUMENTS

CN    105850086 A    8/2016
CN    105867835 A    8/2016
(Continued)

OTHER PUBLICATIONS

Corresponding International Patent Application No. PCT/CN2022/089353, International Search Report, Date Mailed Aug. 17, 2022.
(Continued)

*Primary Examiner* — Michael Sun
(74) *Attorney, Agent, or Firm* — Cooper Legal Group, LLC

(57) ABSTRACT

The present application relates to a dynamic self-adaptive virtual channel mapping method and apparatus, and a storage medium. The method includes: monitoring equivalent data flows of transaction layer packets of different transmit classes, and obtaining the sum of the equivalent data flows of all the transmit classes, the equivalent data flow being the product of a data length of the transaction layer packet and a coefficient; obtaining a pre-calculation value of the number of virtual channels corresponding to each transmit class base on the sum of the equivalent data flows of the transmit classes; and adjusting mapping from the transmit classes to the virtual channels according to the pre-calculation value to obtain a mapping relationship table from the transmit classes to the virtual channels.

20 Claims, 4 Drawing Sheets

(56) References Cited

U.S. PATENT DOCUMENTS

2010/0165874 A1    7/2010  Brown et al.
2021/0240655 A1*   8/2021  Das Sharma ....... G06F 13/4221

FOREIGN PATENT DOCUMENTS

| CN | 108604199 A | 9/2018 |
| CN | 110581776 A | 12/2019 |
| CN | 112269752 A | 1/2021 |
| CN | 113467938 A | 10/2021 |
| CN | 113806258 A | 12/2021 |

OTHER PUBLICATIONS

Corresponding International Patent Application No. PCT/CN2022/089353, Written Opinion, Date Mailed Aug. 17, 2022.
Corresponding Chinese Patent Application No. CN202111354729.5, First Office Action, dated Dec. 29, 2021.
Corresponding Chinese Patent Application No. CN202111354729.5, Notification to Grant, dated Jan. 18, 2022.
Kim, Seonbong, et al., "Optimized I/O Determinism for Emerging NVM-based NVMe SSD in an Enterprise System", 2018 55th ACM/ESDA/IEEE Design Automation Conference (DAC), Sep. 20, 2018, pp. 1-6.

* cited by examiner

DYNAMIC SELF-ADAPTIVE VIRTUAL CHANNEL MAPPING METHOD AND APPARATUS, AND STORAGE MEDIUM

CROSS-REFERENCE TO RELATED APPLICATION

This application claims priority to Chinese Patent Application No. 202111354729.5, filed on Nov. 16, 2021 in China National Intellectual Property Administration and entitled "Dynamic Self-Adaptive Virtual Channel Mapping Method and Apparatus, and Storage Medium", which is hereby incorporated by reference in its entirety.

FIELD

The present application relates to the field of chip design, in particular to a dynamic self-adaptive virtual channel mapping method and apparatus, and a storage medium.

BACKGROUND

A PCIe (Peripheral Component Interconnect Express) bus is a high-speed serial computer extended bus standard and a high-performance and universal I/O interconnection bus defined for computing and communication platforms, especially suitable for high-speed real-time communication. At present, the PCIe bus is widely used, including personal computers, servers, storage, Systems on Chip (SOC), and the like.

From the specific technical point of view, PCIe is an encapsulation layer protocol, which mainly includes a transaction layer, a data link layer and a physical layer. In PCIe architecture, data packets are first generated in a device core of a device, pass through the transaction layer, the data link layer and the physical layer of the device in sequence, and finally are transmitted out. Data at a receiver also needs to pass through the physical layer, the data link layer and the transaction layer in sequence, and finally reaches the device core.

The transaction layer of PCIe is divided into transmitting and receiving, responsible for generating an outward TLP (Transaction Layer Packet) to the data link layer and receiving an inward TLP. VCs (Virtual Channel) and flow control are key technologies and technical difficulties. From the physical link point of view, all types of TLPs transmitted or received by the same device pass through the same physical path. When no VC is used, TLPs can only be received or transmitted in chronological order, which will lead to the problem of low transmission efficiency. For example, a PCIe device continuously transmits two functionally unrelated instructions to two PCIe devices. When there is no virtual channel, one instruction is required to be executed after the previous instruction is transmitted to the corresponding device and the device executes specific operations. The waiting process may be long. At this moment, the bus is idle but required to wait, which seriously reduces bus efficiency. When a virtual channel is used, one instruction may be transmitted to the corresponding device without operation completion after the previous instruction is transmitted to the corresponding device. However, when two instructions are related, the two instructions cannot be transmitted to two virtual channels. Therefore, mapping from different instructions to VCs is the key technology that affects the correctness and transmission efficiency of a PCIe system.

In header information of a TLP, PCIe defines TC (Transmit Class) attribute parameters, and defines 8 traffic classes in total. How to map TLPs of different TCs to VCs is a mapping method of virtual channels. A PCIe protocol stipulates that TLPs of the same TC must be mapped to the same VC and different TCs may also be mapped to the same VC.

The inventors are aware that in the prior art, the following mapping methods are generally used: 1. TC values correspond to VC values one by one. That is, TC0 is mapped to VC0, TC1 is mapped to VC10, and so on. 2. A fixed mapping relationship between TCs and VCs is preset. That is, before the project development, the mapping relationship between TCs and VCs is determined in advance according to actual demands, and cannot be changed during the system operation.

In the prior art, the mapping relationship between TCs and VCs cannot be dynamically adjusted, a requested bandwidth does not match a virtual channel cache space, and the bus utilization rate of the PCIe system is low, thus affecting the performance of SOC chips.

SUMMARY

The present application provides a dynamic self-adaptive virtual channel mapping method. The method includes:
  monitoring equivalent data flows of transaction layer packets of different transmit classes, and obtaining the sum of the equivalent data flows of all the transmit classes, the equivalent data flow being the product of a data length of the transaction layer packet and a coefficient;
  obtaining a pre-calculation value of the number of virtual channels corresponding to each transmit class base on the sum of the equivalent data flows of the transmit classes; and
  adjusting the mapping from the transmit classes to the virtual channels according to the pre-calculation value to obtain a mapping relationship table from the transmit classes to the virtual channels.

In some embodiments, the monitoring equivalent data flows of transaction layer packets of different transmit classes includes:
  generating a time interval of each monitoring according to a system clock, performing one statistical analysis every predetermined time, generating an enable signal of monitoring every predetermined time by counting the system clock, and monitoring the equivalent data flows of the transaction layer packets of different transmit classes.

In some embodiments, the monitoring equivalent data flows of transaction layer packets of different transmit classes includes:
  calculating an equivalent data flow of a single transmit class according to the sum of equivalent data flows of instructions within the same monitoring period, and registering the equivalent data flow of the single transmit class to obtain a single transmit class equivalent data flow registered value; and
  accumulating the single transmit class equivalent data flow registered values of all the transmit classes to obtain the sum of the equivalent data flows of all the transmit classes.

In some embodiments, the equivalent data flows of the instructions within the monitoring period are calculated by:

$$Flow\_N\_x = (TLP\_coe \times Length)$$

$$TLP\_coe = type\_coe * fmt\_coe$$

where Flow_N_x is the equivalent data flow of a single instruction of an $N^{th}$ transmit class, Length is the data length of a transaction layer packet operated by a current instruction, and type_coe and fmt_coe are both calculation coefficients.

In some embodiments, the obtaining a pre-calculation value of the number of virtual channels corresponding to each transmit class includes:

obtaining the pre-calculation value of the number of virtual channels corresponding to each transmit class according to the following formula:

$$VC\_weight\_N\_PRE = 8*Flow\_sum\_N\_reg/wr\_Flow\_sum,$$

where VC_weight_N_PRE is the pre-calculation value of the number of virtual channels corresponding to a transmit class, Flow_sum_N_reg is the equivalent data flow registered value of the transmit class, wr_Flow_sum is the sum of the equivalent data flows of all the transmit classes, and N and the transmit classes are integers between 0 and 7.

In some embodiments, the obtaining a mapping relationship table from the transmit classes to the virtual channels includes:

determining, the number of virtual channels and channel serial numbers corresponding to transmit class 0, sorting the remaining transmit classes in descending order, determining the corresponding number of virtual channels and channel serial numbers in sequence, and obtaining the mapping relationship table from the transmit classes to the virtual channels, according to the pre-calculation value of the number of virtual channels corresponding to each transmit class.

In some embodiments, the method includes:

dynamically adjusting arbitration priorities of the virtual channels according to the mapping relationship table from the transmit classes to the virtual channels; and updating the mapping relationship table at the end of a monitoring adjustment period.

The present application also provides a dynamic self-adaptive virtual channel mapping apparatus. The apparatus includes:

a monitoring module, configured to monitor equivalent data flows of transaction layer packets of different transmit classes, and obtain the sum of the equivalent data flows of all the transmit classes, the equivalent data flow being the product of a data length of the transaction layer packet and a coefficient;

a calculation module, configured to obtain a pre-calculation value of the number of virtual channels corresponding to each transmit class base on the sum of the equivalent data flows of the transmit classes; and an adjustment module, configured to adjust mapping from the transmit classes to the virtual channels according to the pre-calculation value to obtain a mapping relationship table from the transmit classes to the virtual channels.

In some embodiments, the monitoring module is configured to:

generate a time interval of each monitoring according to a system clock, perform one statistical analysis every predetermined time, generate an enable signal of monitoring every predetermined time by counting the system clock, and monitor the equivalent data flows of the transaction layer packets of different transmit classes.

The present application further provides a computer device, including a memory and one or more processors. The memory stores computer-readable instructions that, when executed by the one or more processors, cause the one or more processors to perform the steps of the dynamic self-adaptive virtual channel mapping method provided by any of the above-mentioned embodiments.

The present application finally provides one or more non-volatile computer-readable storage media storing computer-readable instructions. The computer-readable instructions, when executed by one or more processors, cause the one or more processors to perform the steps of the dynamic self-adaptive virtual channel mapping method provided by any of the above-mentioned embodiments.

BRIEF DESCRIPTION OF THE DRAWINGS

In order to more clearly illustrate the technical solutions of embodiments of the present application, the drawings required to describe the prior art and the embodiments will be briefly introduced below. It is apparent that the drawings described below are merely some embodiments of the present application, and a person of ordinary skill in the art may obtain other drawings according to these drawings without involving any inventive effort.

DETAILED DESCRIPTION

In order that the objects, technical solutions, and advantages of the present application will be more clearly understood, the present application will be further described in detail hereinafter with reference to the accompanying drawings and embodiments. It will be appreciated that specific embodiments described herein are merely illustrative of the present application and are not intended to be limiting thereof.

Figure 1:
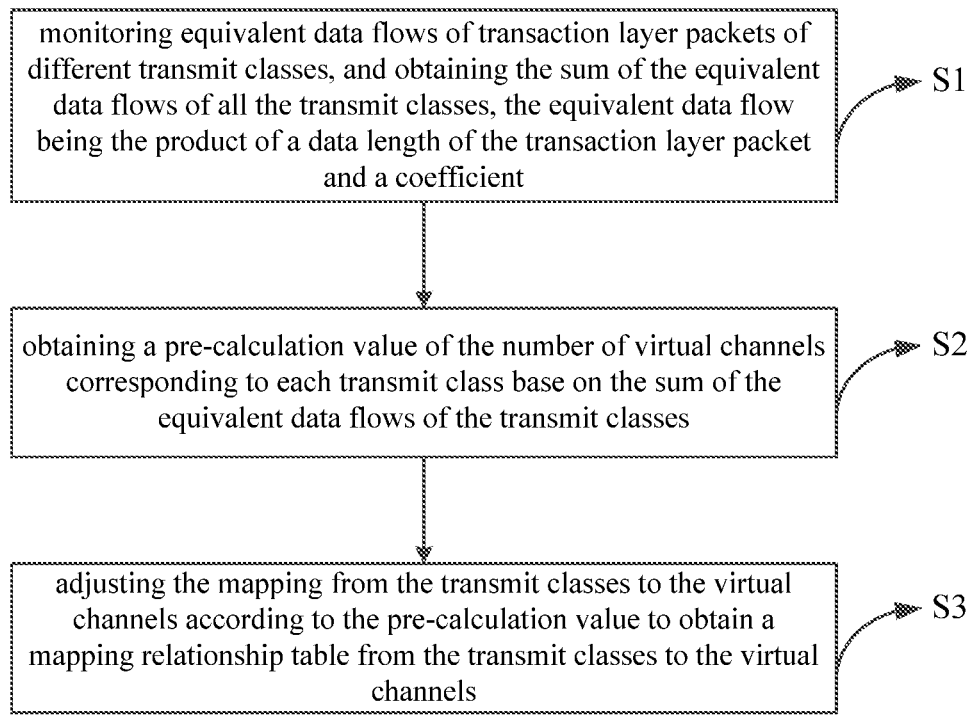
FIG. 1 is a flow chart of a dynamic self-adaptive virtual channel mapping method provided by the present application according to one or more embodiments.

In some embodiments, as shown in FIG. 1, a dynamic self-adaptive virtual channel mapping method is provided. In a case that the method is applied to a computer device, the method includes:

S1: monitoring equivalent data flows of transaction layer packets of different transmit classes, and obtaining the sum of the equivalent data flows of all the transmit classes, the equivalent data flow being the product of a data length of the transaction layer packet and a coefficient.

Specifically, monitoring periods may be configured. The equivalent data flow of a TLC corresponding to each transmit class is monitored within each monitoring period. For example, the value of the transmit class may be an integer between 0 and 7, namely TC0, TC1, . . . , TC7. Then the equivalent data flows corresponding to all the transmit classes are added to obtain the sum of the equivalent data flows of all the transmit classes.

S2: obtaining a pre-calculation value of the number of virtual channels corresponding to each transmit class base on the sum of the equivalent data flows of the transmit classes;

In this step, according to the sum of the equivalent data flows of the transmit classes obtained in step 1, a pre-calculation value of the number of virtual channels corresponding to each transmit class is calculated for the adjustment of a mapping relationship table in the subsequent step.

S3: adjusting the mapping from the transmit classes to the virtual channels according to the pre-calculation value to obtain a mapping relationship table from the transmit classes to the virtual channels.

Specifically, the number of virtual channels and channel serial numbers corresponding to TC0-TC7 are calculated according to the pre-calculation value to form a mapping relationship table, and the mapping relationship table may be updated.

According to the dynamic self-adaptive virtual channel mapping method, equivalent data flows of TLPs with different transmit class values may be monitored in real time, and mapping from transmit classes to virtual channels may be adjusted in real time during the actual operation of a PCIe system by analyzing each path of flow data, whereby the TLP with a high bandwidth request obtains a corresponding large virtual channel buffer space, the TLP with a low speed and low bandwidth request obtains a corresponding small virtual channel buffer space, and arbitration priorities of the virtual channels may be dynamically adjusted at the same time, thus improving the bus utilization rate of the PCIe system and further improving the performance of the whole SOC chip.

In some embodiments, the monitoring equivalent data flows of transaction layer packets of different transmit classes includes:

generating a time interval of each monitoring according to a system clock, performing one statistical analysis every predetermined time, generating an enable signal of monitoring every predetermined time by counting the system clock, and monitoring the equivalent data flows of the transaction layer packets of different transmit classes.

Figure 2:
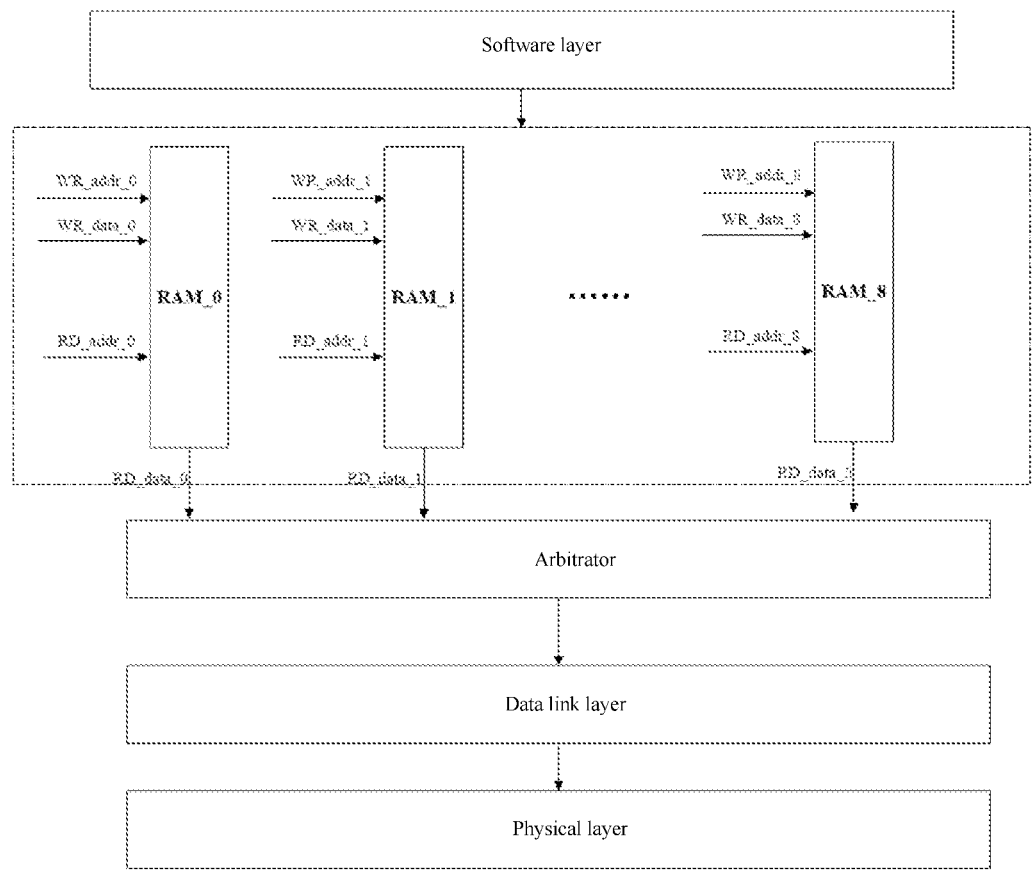
FIG. 2 is a schematic structural diagram of a PCIe system provided by the present application according to one or more embodiments.

As shown in FIG. 2, this embodiment mainly includes 8 groups of RAM memories as carriers of virtual channels during hardware implementation, 8 groups of dual-port random access memories (RAM) with the same size have a data bit width (width) and a depth (Depth), and the size may be freely configured according to actual use environments. For a ram write operation, a write address wr_addr and write data wr_data are provided to ports, and the write enable is pulled high. At this moment, data is written to corresponding address locations. For a ram read operation, a read address rd_addr is provided to the corresponding port, and a read enable signal is pulled high. At this moment, data is read from the port RD_data.

When the system is initialized, a default one-to-one correspondence mapping mode between transmit class values and virtual channel values is used.

A time interval of each monitoring is generated according to a system clock, one statistical analysis is performed every $T_Q$ time, and an enable signal of monitoring every $T_Q$ is generated by counting the system clock.

$$T_Q = K * T$$

where $T_Q$ is a clock period of monitoring, T is a system clock period, $T=1/f_{sys}$, $f_{sys}$ is a system clock frequency, and K is a monitoring clock coefficient, which is configured by a register.

In some embodiments, the monitoring equivalent data flows of transaction layer packets of different transmit classes includes:

calculating an equivalent data flow of a single transmit class according to the sum of equivalent data flows of instructions within the same monitoring period, and registering the equivalent data flow of the single transmit class to obtain a single transmit class equivalent data flow registered value; and accumulating the single transmit class equivalent data flow registered values of all the transmit classes to obtain the sum of the equivalent data flows of all the transmit classes.

Specifically, the flow of each transmit class is calculated in the same manner, and the flows are calculated synchronously and in parallel according to the classification of the transmit class values in header information of a TLP.

In some embodiments, the equivalent data flows of the instructions within the monitoring period are calculated by:

$$\text{Flow\_N\_x} = (\text{TLP\_coe} \times \text{Length})$$

$$\text{TLP\_coe} = \text{type\_coe} * \text{fmt\_coe}$$

where Flow_N_x is the equivalent data flow of a single instruction of an $N^{th}$ transmit class, Length is the data length of a transaction layer packet operated by a current instruction, and type_coe and fmt_coe are both calculation coefficients.

Specifically, in a case that the data flow of TC0 is calculated, the method includes:

(1) Firstly Calculate an Equivalent Data Flow of a Single Instruction

Flow_0_x=(TLP_coe×Length), where Flow_0_x is the equivalent data flow of a single instruction of TC0, TLP_coe is an instruction weight coefficient, and Length is an actual data Length (by DW (double word)) of a current instruction operation, which is obtained from the header information of the TLP.

$$\text{TLP\_coe} = \text{type\_coe} * \text{fmt\_coe}$$

where Type_coe is a type calculation coefficient (type is a parameter in the header information of the TLP)

| type[3:0] | 4'b11xx | 4'b10xx | 4'b01xx | 4'b001x | 4'b000x |
|---|---|---|---|---|---|
| fmt_coe | 1 | 1 | 3 | 3 | 2 | where x represents any value.

fmt_coe is a fmt calculation coefficient (fmt is a parameter in the header information of the TLP), and the corresponding relationship is as follows:

| Fmt[1:0] | 2'b00 | 2'b01 | 2'b10 | 2'b11 |
|---|---|---|---|---|
| fmt_coe | 1 | 1 | 2 | 3 |

The reason for setting different calculation coefficients is that different TLPs have different paths to transmit routes in the system, and the correlations with system configuration are also different, which leads to different bus occupation time.

(2) Calculate the Sum of Equivalent Data Flows of Instructions within the Same Monitoring Period $$Flow\_sum\_0 = Flow\_0\_1 + Flow\_0\_2 + Flow\_0\_3 + \ldots + Flow\_0\_N$$

Flow_sum_0 is the sum of all equivalent data flows of TC0 within the same period.

(3) Register the Sum when Reaching a Monitored Time Point $$Flow\_sum\_0\_reg = Flow\_sum\_0.$$

Flow_sum_0_reg is a registered value of the sum of the equivalent data flows of TC0 within the current period, and the sum is cleared at the next clock period:

$$Flow\_sum\_0 = 0.$$

(4) Sum all TC Data Flows

When the monitored time point is reached, the equivalent data flows of all transmit classes are summed.

$$wr\_Flow\_sum = Flow\_sum\_0\_reg + Flow\_sum\_1\_reg + Flow\_sum\_3\_reg + \ldots + Flow\_sum\_7\_reg$$

wr_Flow_sum is the sum of the equivalent data flows of all TC values within the same period.

In some embodiments, the obtaining a pre-calculation value of the number of virtual channels corresponding to each transmit class includes:

obtaining the pre-calculation value of the number of virtual channels corresponding to each transmit class according to the following formula:

$$VC\_weight\_N\_PRE = 8 * Flow\_sum\_N\_reg / wr\_Flow\_sum$$

VC_weight_N_PRE is the pre-calculation value of the number of virtual channels corresponding to a transmit class, Flow_sum_N_reg is the equivalent data flow registered value of the transmit class, wr_Flow_sum is the sum of the equivalent data flows of all the transmit classes, and N and the transmit classes are integers between 0 and 7.

In some embodiments, the obtaining a mapping relationship table from the transmit classes to the virtual channels includes:

determining, the number of virtual channels and channel serial numbers corresponding to transmit class 0, sorting the remaining transmit classes in descending order, determining the corresponding number of virtual channels and channel serial numbers in sequence, and obtaining the mapping relationship table from the transmit classes to the virtual channels, according to the pre-calculation value of the number of virtual channels corresponding to each transmit class.

Specifically, the number of pre-calculated VC rams when the transmit class is 0 is firstly determined.

If VC_weight_0_PRE<=1, VC_weight_0=1,
and VC_num=0.
If VC_weight_0_PRE>1,
VC_weight_0=VC_weight_0_PRE_up, and VC_num=0.

VC_weight_0 is the corresponding number of VC rams when the transmit class is 0, VC_num is the corresponding VC channel serial number, and VC_weight_0_PRE_up is a rounding-up value of VC_weight_0_PRE.

Secondly, the remaining transmit class values are sorted in descending order, and processed in sequence in descending order, as follows:

The maximum value is generally greater than 1. At this moment, if VC_weight_or_PRE_1>VC_weight_or_PRE_1_up−0.5,
VC_weight_0=VC_weight_0_PRE_up, and VC_num=2.
If
VC_weight_or_PRE_1_up<VC_weight_or_PRE_1<=VC_weight_or_PRE_1_up−0.5,
VC_weight_0=VC_weight_0_PRE_up−1, and VC_num=1.

After that, the second maximum value is determined by the same method as above, which also occupies an independent VC ram. VC_num is added with 1 in sequence.

When the subsequent value is less than 1, the value is written into the subsequent VC ram at this moment. VC_num is added with 1 on the previous basis. A smaller value is determined subsequently, and added with the foregoing value less than 1. If the sum is less than 1.5, the sum is mapped to the same space as the foregoing. If the sum is greater than 1.5, the sum is mapped to the next VC ram. VC_num is added with 1 on the previous basis.

If there is no VC ram remaining when the last array is determined, the value is mapped to TC0.

For example, the mapping relationship table is as follows:

|  | TC0 | TC1 | TC2 | TC3 | TC4 | TC5 | TC6 | TC7 |
|---|---|---|---|---|---|---|---|---|
| VC_weight_N_PRE | 0.6 | 1.2 | 0.1 | 2.6 | 2.2 | 0.6 | 0.4 | 0.3 |
| VC_num | 0 | 3 | 4 | 1 | 2 | 4 | 4 | 4 |

In some embodiments, the method includes:
dynamically adjusting arbitration priorities of the virtual channels according to the mapping relationship table from the transmit classes to the virtual channels; and
updating the mapping relationship table at the end of a monitoring adjustment period.

Details are shown in a table below:

| VC_num | 0 | 1 | 2 | 3 | 4 |
|---|---|---|---|---|---|
| VC ram | 1 | 3 | 2 | 1 | 1 |

The number of rams actually used by different virtual channels in the above table is a reference value for virtual channel arbitration. In view of different arbitration methods in different use environments, only the reference value is provided here. According to this reference value, arbiter parameters may be adjusted. For example, when a method of fixed priority is used, channels with the maximum VC ram may be endowed with the highest arbitration authority and arranged in sequence. When an arbitration method of time slicing is used, the proportion of VC rams may be used as the benchmark of time slicing.

At the end of a monitoring adjustment period, a new mapping relationship and an arbitration reference value are updated.

It will be appreciated that, although the various steps in the flow chart of FIG. 1 are shown in sequence as indicated by the arrows, these steps are not necessarily performed in the order indicated by the arrows. These steps are performed in no strict order unless explicitly stated herein, and these steps may be performed in other orders. Moreover, at least some of the steps in FIG. 1 may include a plurality of sub-steps or a plurality of stages. These sub-steps or stages are not necessarily performed at the same time, but may be performed at different times. These sub-steps or stages are not necessarily performed in sequence, but may be performed in turn or in alternation with other steps or at least some of the sub-steps or stages in other steps.

Figure 3:
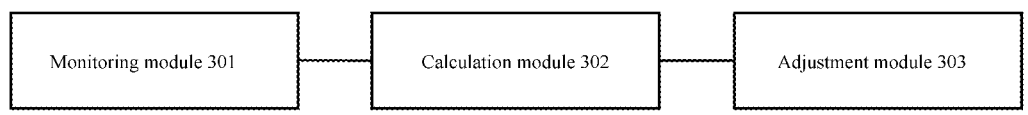
FIG. 3 is a structural block diagram of a dynamic self-adaptive virtual channel mapping apparatus provided by the present application according to one or more embodiments.

In some embodiments, as shown in FIG. 3, a dynamic self-adaptive virtual channel mapping apparatus is provided. The apparatus includes:
a monitoring module 301, configured to monitor equivalent data flows of transaction layer packets of different transmit classes, and obtain the sum of the equivalent data flows of all the transmit classes, the equivalent data flow being the product of a data length of the transaction layer packet and a coefficient;
a calculation module 302, configured to obtain a pre-calculation value of the number of virtual channels corresponding to each transmit class base on the sum of the equivalent data flows of the transmit classes and an adjustment module 303, configured to adjust mapping from the transmit classes to the virtual channels according to the pre-calculation value to obtain a mapping relationship table from the transmit classes to the virtual channels.

In some embodiments, the monitoring module 301 is configured to:
generate a time interval of each monitoring according to a system clock, perform one statistical analysis every predetermined time, generate an enable signal of monitoring every predetermined time by counting the system clock, and monitor the equivalent data flows of the transaction layer packets of different transmit classes.

In some embodiments, the monitoring module 301 is configured to:
calculate an equivalent data flow of a single transmit class according to the sum of equivalent data flows of instructions within the same monitoring period, and register the equivalent data flow of the single transmit class to obtain a single transmit class equivalent data flow registered value; and accumulate the single transmit class equivalent data flow registered values of all the transmit classes to obtain the sum of the equivalent data flows of all the transmit classes.

In some embodiments, the monitoring module 301 is configured to calculate the equivalent data flows of the instructions within the monitoring period by:

$$Flow\_N\_x = (TLP\_coe \times Length)$$

$$TLP\_coe = type\_coe * fmt\_coe$$

where Flow_N_x is the equivalent data flow of a single instruction of an $N^{th}$ transmit class, Length is the data length of a transaction layer packet operated by a current instruction, and type_coe and fmt_coe are both calculation coefficients.

In some embodiments, the calculation module 302 is configured to:
obtain the pre-calculation value of the number of virtual channels corresponding to each transmit class according to the following formula:

$$VC\_weight\_N\_PRE = 8 * Flow\_sum\_N\_reg / wr\_Flow\_sum,$$

where VC_weight_N_PRE is the pre-calculation value of the number of virtual channels corresponding to a transmit class, Flow_sum_N_reg is the equivalent data flow registered value of the transmit class, wr_Flow_sum is the sum of the equivalent data flows of all the transmit classes, and N and the transmit classes are integers between 0 and 7.

In some embodiments, the adjustment module 303 is configured to:
determine, the number of virtual channels and channel serial numbers corresponding to transmit class 0, sort the remaining transmit classes in descending order, determine the corresponding number of virtual channels and channel serial numbers in sequence, and obtain the mapping relationship table from the transmit classes to the virtual channels, according to the pre-calculation value of the number of virtual channels corresponding to each transmit class.

In some embodiments, the adjustment module 303 is configured to:
dynamically adjust arbitration priorities of the virtual channels according to the mapping relationship table from the transmit classes to the virtual channels; and
update the mapping relationship table at the end of a monitoring adjustment period.

For a specific limitation of the dynamic self-adaptive virtual channel mapping apparatus, reference may be made to the above limitation of the dynamic self-adaptive virtual channel mapping method. Descriptions are omitted herein. The various modules in the dynamic self-adaptive virtual channel mapping apparatus may be implemented in whole or in part by software, hardware, and combinations thereof. The various modules may be embedded in hardware or separate from a processor in a computer device, or may be stored in software in a memory in the computer device, whereby the processor invokes operations corresponding to the above modules.

Figure 4:
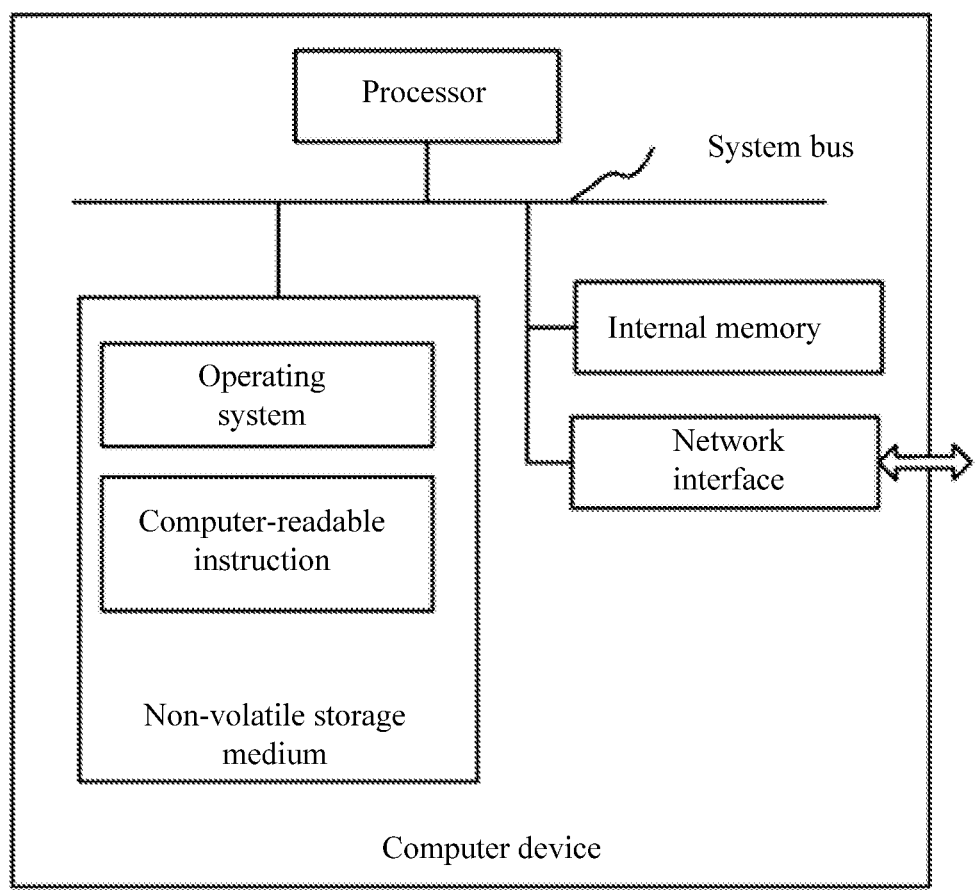
FIG. 4 is a diagram depicting an internal structure of a computer device provided by the present application according to one or more embodiments.

In some embodiments, a computer device is provided. The computer device may be a server. A diagram depicting an internal structure of the computer device may be as shown in FIG. 4. The computer device includes a processor, a memory and a network interface connected via a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for the operation of the operating system and the computer-readable instructions in the non-volatile storage medium. The network interface of the computer device is configured to communicate with an external terminal via a network connection. The computer-readable instructions are executed by the processor to implement steps of a dynamic self-adaptive virtual channel mapping method according to any of the above-mentioned embodiments.

Figure 5:
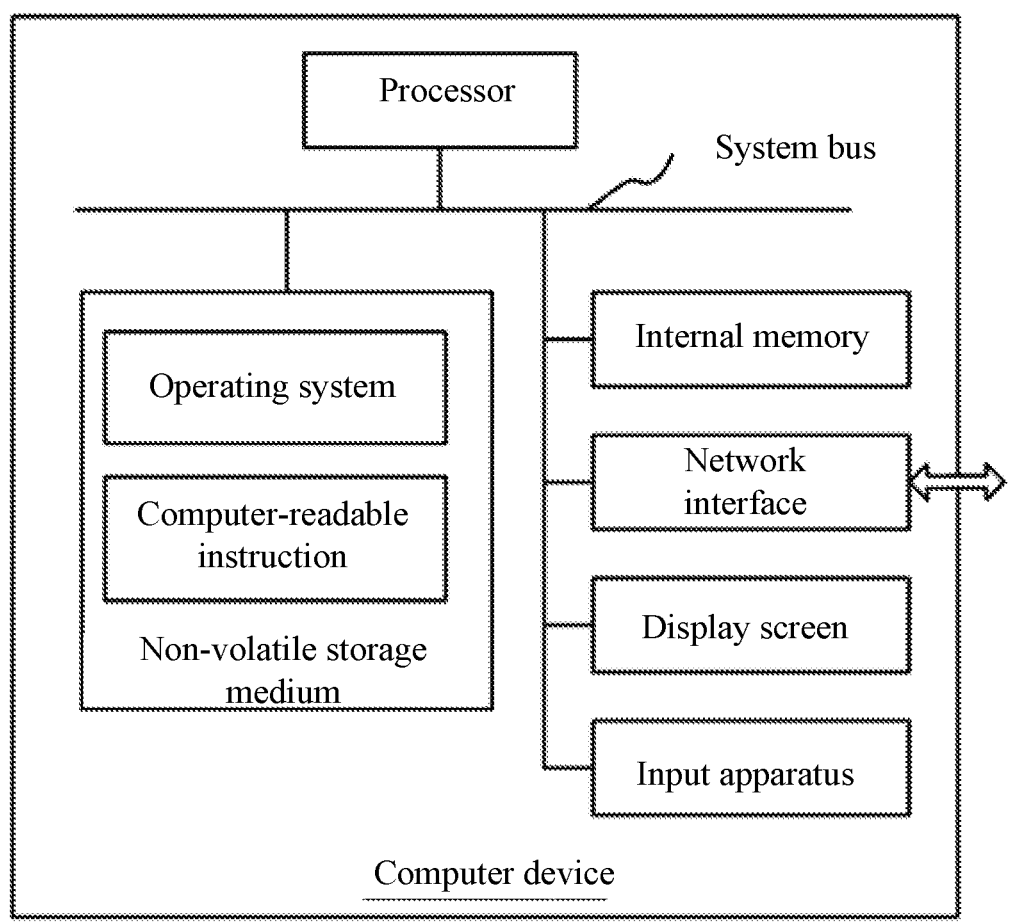
FIG. 5 is a diagram depicting an internal structure of a computer device provided by the present application according to one or more embodiments.

In some embodiments, a computer device is provided. The computer device may be a terminal. A diagram depicting an internal structure of the computer device may be as shown in FIG. 5. The computer device includes a processor, a memory, a network interface, a display screen, and an input apparatus connected via a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for the operation of the operating system and the computer-readable instructions in the non-volatile storage medium. The network interface of the computer device is configured to communicate with an external terminal via a network connection. The computer-readable instructions are executed by the processor to implement a dynamic self-adaptive virtual channel mapping method. The display screen of the computer device may be a liquid crystal display screen or an electronic ink display screen. The input apparatus of the computer device may be a touch layer covering the display screen, a key provided on a housing of the computer device, a trackball or a touchpad, or an external keyboard, a touchpad or a mouse.

It will be appreciated by a person skilled in the art that the structure shown in FIG. 4 or FIG. 5 is merely a block diagram of some of the structures relevant to the solution of the present application and does not constitute a limitation of the computer device to which the solution of the present application is applied. The computer device may specifically include more or fewer components than those shown in the figures, or include some components combined, or have different component arrangements.

Embodiments of the present application also provide a non-volatile computer-readable storage medium. The non-volatile computer-readable storage medium stores computer-readable instructions. The computer-readable instructions are executed by one or more processors to implement steps of a dynamic self-adaptive virtual channel mapping method according to any of the above-mentioned embodiments.

A person of ordinary skill in the art may appreciate that all or some of processes of the above-mentioned method embodiments may be implemented by computer instructions instructing relevant hardware. The computer-readable instructions may be stored in a non-volatile computer-readable storage medium. When the computer-readable instructions are executed, the processes of the method embodiments may be included. Any reference to a memory, storage, a database, or another medium used in the various embodiments provided by the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in various forms, such as a static RAM (SRAM), a dynamic RAM (DRAM), a synchronous DRAM (SDRAM), a dual data rate SDRAM (DDRSDRAM), an enhanced SDRAM (ESDRAM), a synchronous link (Synchlink) DRAM (SLDRAM), a memory bus (Rambus) direct RAM (RDRAM), a direct memory bus dynamic RAM (DRDRAM), and a memory bus dynamic RAM (RDRAM).

The technical features of the above embodiments may be combined in any combination, and in order to make the description concise, not all the possible combinations of the technical features in the above-mentioned embodiments are described. However, as long as there is no contradiction between the combinations of these technical features, the combinations should be considered as the scope of the description.

The above-mentioned embodiments express only a few implementations of the present application, which are described in greater detail but are not to be construed as limiting the scope of the present application. It will be appreciated by a person of ordinary skill in the art that numerous variations and modifications may be made without departing from the concept of the present application, which fall within the protection scope of the present application. Therefore, the protection scope of the present application should be determined by the appended claims.

What is claimed is:

1. A dynamic self-adaptive virtual channel mapping method, comprising:
    monitoring equivalent data flows of transaction layer packets of different transmit classes, and obtaining the sum of the equivalent data flows of all the transmit classes, the equivalent data flow being the product of a data length of the transaction layer packet and a coefficient;
    obtaining a pre-calculation value of the number of virtual channels corresponding to each transmit class base on the sum of the equivalent data flows of the transmit classes; and
    adjusting the mapping from the transmit classes to the virtual channels according to the pre-calculation value to obtain a mapping relationship table from the transmit classes to the virtual channels.

2. The method according to claim 1, wherein the monitoring equivalent data flows of transaction layer packets of different transmit classes comprises:
    generating a time interval of each monitoring according to a system clock, performing one statistical analysis every predetermined time, generating an enable signal of monitoring every predetermined time by counting the system clock, and monitoring the equivalent data flows of the transaction layer packets of the different transmit classes.

3. The method according to claim 2, wherein the monitoring equivalent data flows of transaction layer packets of different transmit classes comprises:
    calculating an equivalent data flow of a single transmit class according to a sum of equivalent data flows of instructions within a same monitoring period, and registering the equivalent data flow of the single transmit class to obtain a single transmit class equivalent data flow registered value; and
    accumulating the single transmit class equivalent data flow registered values of all the transmit classes to obtain the sum of the equivalent data flows of all the transmit classes.

4. The method according to claim 3, wherein the equivalent data flows of the instructions within the same monitoring period are calculated by:

$$Flow\_N\_x = (TLP\_coe \times Length);$$

and $$TLP\_coe = type\_coe * fmt\_coe;$$

wherein Flow_N_x is the equivalent data flow of a single instruction of an $N^{th}$ transmit class, Length is the data length of a transaction layer packet operated by a current instruction, and type_coe and fmt_coe are both calculation coefficients.

5. The method according to claim 4, wherein the obtaining a pre-calculation value of the number of virtual channels corresponding to each transmit class comprises:
    obtaining the pre-calculation value of the number of virtual channels corresponding to each transmit class according to the following formula:

$$VC\_weight\_N\_PRE = 8 * Flow\_sum\_N\_reg / wr\_Flow\_sum;$$

wherein VC_weight_N_PRE is the pre-calculation value of the number of virtual channels corresponding to a transmit class, Flow_sum_N_reg is an equivalent data flow registered value of the transmit class, wr_Flow_sum is the sum of the equivalent data flows of all the transmit classes, and N and the transmit classes are integers between 0 and 7.

6. The method according to claim 5, wherein the obtaining a mapping relationship table from the transmit classes to the virtual channels comprises:
    determining a number of virtual channels and channel serial numbers corresponding to transmit class 0, sorting remaining transmit classes in descending order, determining a corresponding number of virtual channels and channel serial numbers in sequence, and obtaining the mapping relationship table from the transmit classes to the virtual channels, according to the pre-calculation value of the number of virtual channels corresponding to each transmit class.

7. The method according to claim 6, wherein further comprising:
    dynamically adjusting arbitration priorities of the virtual channels according to the mapping relationship table from the transmit classes to the virtual channels.

8. The method according to claim 2, further comprising:
    using a default one-to-one correspondence mapping mode between transmit class values and a virtual channel of the virtual channels when a system is initialized.

9. The method according to claim 2, wherein the predetermined time is calculated by $T_Q = K*T$;
    where $T_Q$ is a clock period of monitoring, T is a system clock period, $T = 1/f_{sys}$, $f_{sys}$ is a system clock frequency, and K is a monitoring clock coefficient, which is configured by a register.

10. The method according to claim 3, further comprising:
    classifying each transaction layer packet of the transaction layer packets according to transmit class values in header information of each of the transaction layer packets to obtain the transaction layer packet of the different transmit classes.

11. The method according to claim 10, wherein the equivalent data flow of each of the transmit classes of the different transmit classes is calculated in a same manner, and the equivalent data flow of each of the transmit classes is calculated synchronously and in parallel.

12. The method according to claim 6, further comprising:
    updating the mapping relationship table at an end of a monitoring adjustment period.

13. The method according to claim 7, wherein the dynamically adjusting arbitration priorities of the virtual channels according to the mapping relationship table from the transmit classes to the virtual channels comprises:
    determining an amount of random-access memory (RAM) memory for each of the virtual channels according to the mapping from the transmit classes to the virtual channels, assigning a highest arbitration authority to a virtual channel of the virtual channels corresponding to a maximum amount of the RAM memory and arranged in sequence.

14. The method according to claim 7, wherein the dynamically adjusting arbitration priorities of the virtual channels according to the mapping relationship table from the transmit classes to the virtual channels comprises:
    determining an amount of random-access memory (RAM) memory for each of the virtual channels according to the mapping from the transmit classes to the virtual channels, using a proportion of the amount of the RAM memory for each of the virtual channels as a benchmark of time slicing.

15. The method according to claim 1, wherein the monitoring equivalent data flows of transaction layer packets of different transmit classes comprises:
    configuring monitoring periods, monitoring the equivalent data flow corresponding to each of the transmit classes within each of the monitoring periods.

16. The method according to claim 15, wherein the obtaining the sum of the equivalent data flows of all the transmit classes comprises:
    adding the equivalent data flows corresponding to all the transmit classes to obtain the sum of the equivalent data flows of all the transmit classes.

17. A computer device, comprising a memory and one or more processors, wherein the memory stores computer-readable instructions executed by the one or more processors, the one or more processors upon execution of the computer-readable instructions are configured to:
    monitor equivalent data flows of transaction layer packets of different transmit classes, and obtain the sum of the equivalent data flows of all the transmit classes, the equivalent data flow being the product of a data length of the transaction layer packet and a coefficient;

obtain a pre-calculation value of the number of virtual channels corresponding to each transmit class base on the sum of the equivalent data flows of the transmit classes; and adjust the mapping from the transmit classes to the virtual channels according to the pre-calculation value to obtain a mapping relationship table from the transmit classes to the virtual channels.

18. A non-volatile computer-readable storage media storing computer-readable instructions that is executed by a processor, and the computer-readable instructions, upon execution by the processor, are configured to cause the processor to:

monitor equivalent data flows of transaction layer packets of different transmit classes, and obtain the sum of the equivalent data flows of all the transmit classes, the equivalent data flow being the product of a data length of the transaction layer packet and a coefficient;

obtain a pre-calculation value of the number of virtual channels corresponding to each transmit class base on the sum of the equivalent data flows of the transmit classes; and adjust the mapping from the transmit classes to the virtual channels according to the pre-calculation value to obtain a mapping relationship table from the transmit classes to the virtual channels.

19. The non-volatile computer-readable storage media storing computer-readable instructions according to claim 18, wherein the computer program, upon execution by the processor, is further configured to cause the processor to:

generate a time interval of each monitoring according to a system clock, perform one statistical analysis every predetermined time, generate an enable signal of monitoring every predetermined time by counting the system clock, and monitor the equivalent data flows of the transaction layer packets of the different transmit classes.

20. The non-volatile computer-readable storage media storing computer-readable instructions according to claim 19, wherein the computer program, upon execution by the processor, is further configured to cause the processor to:

calculating an equivalent data flow of a single transmit class according to a sum of equivalent data flows of instructions within a same monitoring period, and registering the equivalent data flow of the single transmit class to obtain a single transmit class equivalent data flow registered value; and accumulating the single transmit class equivalent data flow registered values of all the transmit classes to obtain the sum of the equivalent data flows of all the transmit classes.

* * * * *